United States Patent [19]
Eiden

[11] Patent Number: 5,153,497
[45] Date of Patent: Oct. 6, 1992

[54] CIRCUIT FOR REGULATING CHARGING OF A STORAGE BATTERY BY A PHOTOVOLTAIC ARRAY

[76] Inventor: Glenn E. Eiden, 302 U.S. 30 East, New Haven, Ind. 46774

[21] Appl. No.: 751,066

[22] Filed: Aug. 28, 1991

[51] Int. Cl.$^5$ ............................................. H02J 7/00
[52] U.S. Cl. ....................................... 320/61; 320/39; 323/906
[58] Field of Search ................... 320/61, 39, 21, 2; 323/906

[56] References Cited

U.S. PATENT DOCUMENTS

| | | | |
|---|---|---|---|
| 4,175,249 | 11/1979 | Gruber | 323/15 |
| 4,200,833 | 4/1980 | Wilkerson | 323/20 |
| 4,306,183 | 12/1981 | Wright | 320/39 |
| 4,313,078 | 1/1982 | Bilsky et al. | 320/15 |
| 4,314,198 | 2/1982 | Rogers | 323/351 |
| 4,327,318 | 4/1982 | Kwon et al. | 320/39 |
| 4,384,317 | 5/1983 | Stackpole | 362/183 |
| 4,453,119 | 6/1984 | Staler et al. | 320/39 |
| 4,571,532 | 2/1986 | Jaster | 320/2 |
| 4,649,287 | 3/1987 | Nola | 307/31 |
| 4,661,758 | 4/1987 | Whittaker | 320/21 |
| 4,714,868 | 12/1987 | Maruyama et al. | 320/5 |
| 4,742,291 | 5/1988 | Bobier et al. | 320/39 |
| 4,873,480 | 10/1989 | Lafferty | 323/229 |

Primary Examiner—Steven L. Stephan
Assistant Examiner—Adolf Berhane
Attorney, Agent, or Firm—George Pappas

[57] ABSTRACT

A circuit for regulating the charging of a storage battery by a photovoltaic array includes a relay switch connected between the storage battery and photovoltaic array. An operational amplifier connected as a differential amplifier with a low-pass filter has one input terminal connected to the storage battery through a resistive divider and the other input terminal connected to a voltage reference. The output of the operational amplifier is connected to the input of a transistor amplifier having an output connected to the control coil of the relay switch. When the battery voltage exceeds a predetermined setpoint, as presented to the input terminal of the operational amplifier through the resistive divider, relative to the voltage reference, the operational amplifier and transistor amplifier de-energize the control coil of the relay switch, thereby opening the relay switch and disconnecting the photovoltaic array from the storage battery. As the voltage of the storage battery falls below the setpoint, the state of the relay switch is reversed and charging resumes. The low pass filter prevents the relay switch from changing state at a frequency greater than a preselected frequency.

17 Claims, 1 Drawing Sheet

CIRCUIT FOR REGULATING CHARGING OF A STORAGE BATTERY BY A PHOTOVOLTAIC ARRAY

BACKGROUND OF THE INVENTION

1. Field of the Invention

The present invention relates generally to circuits for regulating charging of storage batteries by photovoltaic arrays, and more particularly to a circuit that prevents overcharging of the storage battery.

2. Description of the Related Art

U.S. Pat. No. 4,453,119, issued to Staler et al., shows an electrical charging control apparatus for regulating the charging of a rechargeable battery by a solar panel. Control of the charging is through a relay which directly connects the solar panel to the terminals of the battery. The relay is opened and closed by signal testing circuitry which opens the relay when the voltage at the battery reaches a chosen charging threshold. The voltage level of the battery is tested against a reference voltage.

U.S. Pat. No. 4,306,183, issued to Wright, shows a voltage regulations circuit including an operational amplifier connected as an integrator which generates an output signal representing the time integral of the error between the voltage across the battery and a reference voltage provided by a zener diode. The integrator circuit output is connected to a series of voltage comparators, each of which controls one of a series of transistor shunt switches, wherein a plurality of solar arrays are sequentially disconnected from the battery as the voltage of the battery increases during charging. The solar arrays are disconnected from the battery by having their outputs shunted to ground by transistor switches 21-25, thereby causing diodes connected between the solar arrays and the battery to become reverse biased.

The above described related art is believed to be unnecessarily complex for the purpose of regulating the charging of a storage battery by a photovoltaic array. It would be desirable to provide a circuit for regulating charging of a storage battery by a photovoltaic array that is simple, efficient and inexpensive. This and other desires are satisfied by the present invention.

SUMMARY OF THE INVENTION

A circuit for regulating charging of a storage battery by a photovoltaic array includes an electrically operated relay switch connected between the storage battery and the photovoltaic array. The relay switch has a control coil. An operational amplifier is connected as a differential amplifier with an active low-pass filter, the operational amplifier having a first input terminal connected to the storage battery and having a second input terminal connected to a fixed reference voltage source. A transistor amplifier is provided having an input connected to the output terminal of the operational amplifier and having an output connected to the control coil of the relay switch. The operational amplifier and transistor amplifier are so configured as to cause the relay switch to open when the voltage at the first input terminal of the operational amplifier exceeds the voltage at the second input terminal of the operational amplifier, thereby disconnecting the photovoltaic array from the battery, and to cause the relay switch to close when the voltage at the first input terminal of the operational amplifier is less than the voltage at the second input terminal of the operational amplifier, thereby reconnecting the photovoltaic array to the battery. The low-pass filter of the operational amplifier prevents the relay switch from changing state at a frequency greater than a preselected frequency.

It is an object of the present invention to provide a simple, efficient and inexpensive circuit for controlling the charging of a storage battery by a photovoltaic array.

Other objects and advantages of the present invention will be apparent from the following descriptions of a preferred embodiment with reference to the drawing.

DESCRIPTION OF THE PREFERRED EMBODIMENT

Figure 1:
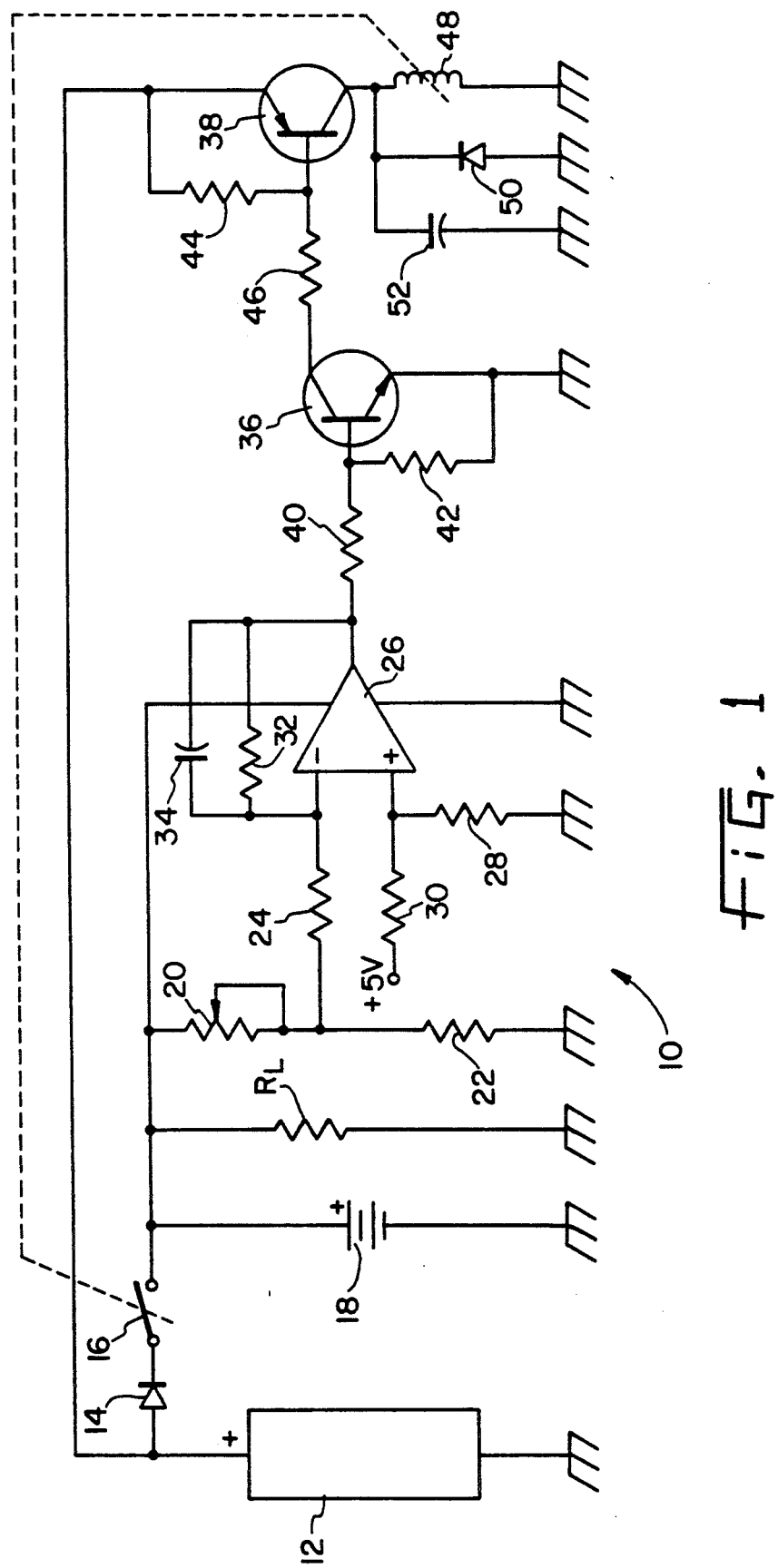
FIG. 1 is a schematic drawing of a circuit for regulating the charging of a storage battery by a photovoltaic array in accordance with the present invention.

Referring in particular to FIG. 1, there is illustrated a circuit 10 in accordance with the present invention for regulating the charging of a storage battery by a photovoltaic array. The circuit includes a photovoltaic array 12 which generates direct current at about 18 volts with no load when exposed to full sunlight. The positive terminal of photovoltaic array 12 is connected to one terminal of a forward-biased diode 14 and the other terminal of diode 14 is connected to one terminal of a relay switch 16. The other terminal of relay switch 16 is connected to the positive terminal of a nominal 12 volt (13.8 volt) rechargeable lead acid storage battery 18. Diode 14 and switch 16 are connected in series between the positive terminal of photovoltaic array 12 and the positive terminal of storage battery 18. Diode 14 prevents current from flowing from storage battery 18 to photovoltaic array 12 during those times (such as during diminished illumination) when the output voltage of photovoltaic array 12 is less than the terminal voltage of battery 18. The positive terminal of battery 18 is connected to one terminal of the load, represented in FIG. 1 as resistor $R_L$. The other terminal of load $R_L$ is connected to ground in common with the negative terminals of the photovoltaic array 12 and battery 18. Load $R_L$ would typically be an electric light that is selectively connected to the circuit 10 during only a portion of a 24-hour day, such as during the nighttime hours. Thus, storage battery 18 would typically supply current to load $R_L$ at night when the load is connected, and would typically be recharged during the day when photovoltaic array 12 is illuminated by the sun and the load is disconnected.

Battery 18 is charged by photovoltaic array 12 so long as photovoltaic array 12 is illuminated sufficiently that the output voltage thereof exceeds the terminal voltage of battery 18 plus the voltage drop across diode 14, and so long as relay switch 16 is closed. Were relay switch 16 to remain closed continuously, however, it would be possible for battery 18 to become overcharged during those periods in which the output voltage of photovoltaic array 12 is high and the current drawn by the load is low. Therefore, circuit 10 further includes monitoring and switching circuitry for monitoring the state of charge of battery 18, and for disconnecting photovoltaic array 12 from battery 18 when storage battery 18 reaches a predetermined state of charge as indicated by the terminal voltage rising above a selected voltage setpoint. Similarly, the circuitry causes photovoltaic array 12 to be reconnected to storage battery 18 when the terminal voltage falls below said selected voltage setpoint.

More particularly, the monitoring circuitry includes a resistive divider comprised of variable resistor 20 having a first terminal connected to the positive terminal of battery 18 and a second terminal connected to a first terminal of a fixed resistor 22. The second terminal of fixed resistor 22 is connected to common ground. The junction of resistors 20 and 22 is connected through resistor 24 to the inverting input terminal of an operational amplifier 26. The non-inverting input terminal of operational amplifier 26 is connected through resistor 28 to ground, and through resistor 30 to a regulated 5 volt voltage source serving as a voltage reference. The 5-volt reference voltage can be provided, for example, by a commonly available three-terminal integrated circuit voltage regulator powered directly from photovoltaic array 12. The output terminal of operational amplifier 26 is connected through a feedback resistor 32 and a feedback capacitor 34 to the inverting input terminal of operational amplifier 26. Feedback resistor 32 and feedback capacitor 34 are connected in parallel to one another.

As so configured, operational amplifier 26 functions as a differential amplifier with an active low-pass filter, wherein the cutoff frequency of the low-pass filter is 1/RC, where R is the value of resistor 32 and C is the value of capacitor 34. The gain of operational amplifier 26, which is preferably set at about 85 by proper proportioning of resistors 24, 28, 30 and 32 according to well understood principles, decreases rapidly above the cutoff frequency. By sizing the feedback components appropriately, a cutoff frequency of the active low-pass filter can be established such that operational amplifier 26 is not responsive to oscillations of voltage at the inverting input terminal relative to the 5-volt voltage reference at the noninverting input terminal that occur at a frequency greater than about 1 Hz. Thus, extremely rapid cycling of the switching circuitry is prevented as the state of charge of storage battery 18 hovers about the selected set point.

The output terminal of operational amplifier 26 is connected to switching circuitry including a complementary symmetrical transistor amplifier circuit comprising bipolar junction transistors 36 and 38, and DC bias transistors 40, 42, 44 and 46. Transistors 36 and 38 provide current gain and proper signal phase relative to the output terminal of operational amplifier 26 for driving relay coil 48, described further below. More particularly, the output terminal of operational amplifier 26 is connected through resistor 40 to the base terminal of NPN transistor 36. The base terminal of transistor 36 is connected to ground through resistor 42, and the emitter terminal is grounded directly. The collector terminal of transistor 36 is connected through resistor 46 to the base terminal of PNP transistor 38. The base terminal of transistor 38 is connected to the emitter terminal through resistor 44, and the emitter terminal is connected directly to the positive terminal of the photovoltaic array. The collector terminal of transistor 38 is connected through relay coil 48 to ground. Diode 50 and capacitor 52 ar connected in parallel with relay coil 48 and serve to suppress voltage transients generated by relay coil 48. Switch 16, described above, is controlled by relay coil 48.

During operation, when the selected voltage setpoint for storage battery 18 is exceeded, operational amplifier 26 and transistors 36 and 38 de-energize relay coil 48 so as to permit switch 16 to open, thereby disconnecting photovoltaic array 12 from storage battery 18. The voltage setpoint is selected by adjusting variable resistor 20 such that the voltage at the junction of resistors 20 and 22 of the resistive divider is equal to 5 volts when the positive terminal of storage battery 18 is at the setpoint. Thus, as storage battery 18 charges toward the selected voltage setpoint, the voltage presented at the inverting input of operational amplifier 26 approaches the 5 volt reference which is presented at the noninverting input. When the voltage at the inverting input exceeds the reference voltage at the noninverting input of operational amplifier 26, the output voltage of operational amplifier switches polarity, and acting through amplifier transistors 36 and 38, causes current through relay coil 48 to cease, thereby opening switch 16. Once charging current from photovoltaic array 12 is thus disconnected from storage battery 18, battery 18 begins to discharge, either through load $R_L$ or due to natural internal processes, such that the terminal voltage at battery 18 begins to drop. As the voltage presented at the inverting terminal of operational amplifier 26 drops below the 5 volt reference, due to discharge of battery 18, the status of relay coil 48 and switch 16 is reversed, causing photovoltaic array 12 to be reconnected to storage battery 18, which permits further charging to take place. Diode 14, described above, isolates storage battery 18 from transistors 36 and 38 and from relay coil 48. The low-pass filter effect of operational amplifier 26 prevents relay switch 16 from changing state at a rate greater than about 1 Hz.

In the preferred embodiment, when the battery voltage is below about 12.5 volts, the voltage presented at the inverting input terminal of operational amplifier 26 never exceeds the 5-volt reference voltage and thus switch 16 remains closed continuously. As the battery voltage rises above about 12.5 volts, circuit 10 controls switch 16 so as to pulse width modulate the charging current from photovoltaic array 12 to battery 18. When pulse width modulation begins, switch 16 is closed about 90% and open about 10% of the time. As battery 18 approaches full charge, switch 16 is closed about 30% and open about 70% of the time.

While the present invention has been particularly described in terms of a preferred embodiment, it should be understood that no limitation of the scope of the invention is intended thereby, and that the scope of the invention includes variations, uses or adaptations of the invention following the general principles thereof, including such departures from the present disclosure as come within known or customary practice in the art to which this invention pertains, limited only by the claims appended hereto.

What is claimed is:

1. A circuit for regulating charging of a storage battery by a photovoltaic array comprising:

an electrically operated relay switch connected between said storage battery and said photovoltaic array, said relay switch having a control coil;

an operational amplifier having two input terminals and one output terminal connected as a differential amplifier with an active low-pass filter, said operational amplifier having a first input terminal connected to said storage battery and having a second input terminal connected to a fixed reference voltage source;

a transistor amplifier having an input connected to the output terminal of said operational amplifier and having an output connected to the control coil of said relay switch;

said operational amplifier and transistor amplifier being so configured as to cause said relay switch to open when the voltage at the first input terminal of said operational amplifier exceeds the voltage at the second input terminal of said operational amplifier, thereby disconnecting said photovoltaic array from said battery, and so as to cause said relay switch to close when the voltage at the first input terminal of said operational amplifier is less than the voltage at the second input terminal of said operational amplifier, thereby reconnecting said photovoltaic array to said battery, the low-pass filter of said operational amplifier preventing said relay switch from changing state at a frequency greater than a preselected frequency.

2. The circuit of claim 1, and further including a resistive divider across said storage battery, said first input terminal of said operational amplifier being connected to said resistive divider, and said fixed reference voltage being some fraction of the full charge voltage of said storage battery.

3. The resistive divider of claim 2, in which the ratio of division is adjustable.

4. The circuit of claim 1, in which said transistor amplifier is powered directly by said photovoltaic array.

5. The circuit of claim 4, and further including a diode connected between said photovoltaic array and said battery to isolate said battery from said transistor amplifier and relay switch control coil.

6. The circuit of claim 2, in which said transistor amplifier is powered directly by said photovoltaic array.

7. The circuit of claim 6, and further including a diode connected between said photovoltaic array and said battery to isolate said battery from said transistor amplifier and relay switch control coil.

8. The circuit of claim 7, in which said operational amplifier has a feedback resistor and a feedback capacitor connected in parallel with one another and connected between the output terminal and the first input terminal of said operational amplifier, whereby said low pass filter configuration is provided.

9. The circuit of claim 1, in which said operational amplifier has a feedback resistor and a feedback capacitor connected in parallel with one another and connected between the output terminal and the first input terminal of said operational amplifier, whereby said low pass filter configuration is provided.

10. The circuit of claim 9, in which said transistor amplifier includes a pair of NPN and PNP bipolar junction transistors connected as complementary symmetrical amplifiers.

11. The circuit of claim 1, in which said transistor amplifier includes a pair of NPN and PNP bipolar junction transistors connected as complementary symmetrical amplifiers.

12. A circuit for regulating charging of a storage battery for a photovoltaic array comprising:

switch means connected between said storage battery and said photovoltaic array for connecting and disconnecting said array and storage battery, said switch means operating to connect and disconnect in response to a control signal;

an operational amplifier having an output connected to and providing said control signal to said switch means, a first input terminal connected to said storage battery and a second input terminal connected to a fixed reference voltage source;

low pass filter means connected between said operational amplifier output and said first input terminal for limiting the control signal frequency and preventing said switch means for changing state at a frequency greater than a preselected frequency and for causing said control signal width to be inversely proportional to a pre-selected battery voltage as the battery voltage increases to said pre-selected battery voltage;

said switch means disconnecting said storage battery and array when the voltage at said first input terminal exceeds said fixed reference voltage at said second input terminal and re-connecting said storage battery and array when the voltage at said first input terminal is less than said second input terminal; and, wherein said low pass filter means decreases the time during which said storage battery and array are connected as the battery voltage increases and reaches said pre-selected battery voltage.

13. The circuit of claim 12 further including a resistive divider across said storage battery, said first input terminal of said operational amplifier being connected to said resistive divider, and said fixed reference voltage being some fraction of the full charge voltage of said storage battery.

14. The resistive divider of claim 13 wherein the ratio of division is adjustable.

15. The circuit of claim 12 further comprising a transistor amplifier having an input connected to the output terminal of said operational amplifier and having an output connected to said switch means, said transistor amplifier amplifying said control signal.

16. The circuit of claim 12 further including a diode connected between said photovoltaic array and said storage battery.

17. The circuit of claim 12 wherein said low pass filter means includes a feed back resistor and a feed back capacitor connected in parallel with one another and connected between the output terminal and the first input terminal of said operational amplifier.

* * * * *

UNITED STATES PATENT AND TRADEMARK OFFICE
CERTIFICATE OF CORRECTION

PATENT NO. : 5,153,497
DATED : October 6, 1992
INVENTOR(S) : Glenn E. Eiden

It is certified that error appears in the above-indentified patent and that said Letters Patent is hereby corrected as shown below:

Column 3, line 63, change "ar" to --are--.

Column 6, Claim 12, line 20, change "for" to --from--.

Signed and Sealed this

Nineteenth Day of October, 1993

Attest:

BRUCE LEHMAN

Attesting Officer      Commissioner of Patents and Trademarks